Patented Sept. 15, 1925.

1,554,151

UNITED STATES PATENT OFFICE.

BENJAMIN D. WHITE, OF PHILADELPHIA, PENNSYLVANIA.

PROCESS OF MANUFACTURING WHOLE-MILK POWDER.

No Drawing. Application filed July 19, 1921. Serial No. 485,987.

*To all whom it may concern:*

Be it known that I, BENJAMIN D. WHITE, a citizen of the United States, residing at Philadelphia, in the county of Philadelphia and State of Pennsylvania, have invented certain new and useful Improvements in Processes of Manufacturing Whole-Milk Powder, of which the following is a specification.

The advantages of converting milk into powder by removing the water content are many and have long been recognized. The practice has grown in recent years until the manufacture of milk powder has become quite an extensive industry. This practice, however, has been largely confined to the treatment of milk after the butter-fat has been removed, because so-called whole milk powder, that is, powder containing the butter-fat content, will not keep for the length of time required to insure commercial success in its manufacture in that the product is likely to become rancid and unfit for use within that period of time after its manufacture required for its marketing and use in a way that will be economical and satisfactory.

The objection to the use of "whole" milk in the manufacture of milk powder results from the fact that one of the fats comprising the so-called butter-fats in the milk, known as butterine, decomposes and causes rancidity in the product.

The object of my invention is to provide a process by which milk may be treated so that the butterine portion of the butter-fat will be freed of the element that causes the tendency to decompose, and thus remove the common danger of rancidity and enable milk powder to be made from whole milk, containing all of the butter-fat content, which shall be of a substantially permanent character capable of keeping for a long period of time, and therefore a successful commercial product, all as will be hereinafter more fully described and claimed.

In the practice of my said process, I take the milk in its natural condition, separate the cream therefrom, by well known methods, convert the cream into butter, separate the butter from the water, casein, and ash; then melt the butter, heat the resulting butter oil to a temperature which will drive off the constituent elements which cause rancidity in butter, or whole milk powder, and then again introduce the oil, after it has been thus treated, into the skimmed milk, emulsify or homogenize the same, by any well known method, and then dry the milk by any of the various approved processes used in the manufacture of dried milk or milk powder, such as, for example, the spray process consisting of spraying the milk into a heated chamber, evaporating the water and collecting the powder.

In heating the butter, or the oil formed by the melted butter, it is preferably raised to a temperature between 150 and 250 degrees F., which temperature will volatilize and remove or drive off those constitutents in the butterine which cause rancidity in butter or whole milk powder.

I do not limit myself, of course, to any process of drying, or to any definite temperature, although in practice I have found that temperatures ranging between the limits above specified produce the result desired and that the powder manufactured from the milk resulting from the reuniting of the various elements thereof after the said treatment, has no tendency to become rancid but will keep sweet and in usable condition for a practically indefinite period of time, or at least for any length of time that will be required in the practical commercial practice of the invention.

It will be understood, of course, that I do not necessarily limit the practice of the invention to use of the identical butter-fat extracted from the milk, as other butter-fat may be treated in the same way and used in the process.

Having thus fully described my said invention, what I claim as new and desire to secure by Letters Patent, is:

1. The process of manufacturing whole milk powder which consists in separating the cream from the milk, converting the cream into butter, heating the butter to volatilize the constituent elements which cause rancidity, combining said butter oil after this treatment with the milk, and then converting into powder, substantially as set forth.

2. A process of manufacturing whole milk powder which consists in separating the cream from the milk, converting the cream into butter, heating the butter to a temperature between 150° and 250° Fahrenheit to volatilize the constituents which cause rancidity, combining the butter oil after this treatment with the milk by emulsifying or homogenizing, and then removing the water content and reducing to powder, substantially as set forth.

In witness whereof, I have hereunto set my hand and seal at Philadelphia, Pennsylvania, this 16th day of July, A. D. nineteen hundred and twenty-one.

BENJAMIN D. WHITE. [L. S.]